July 6, 1937.   E. R. EVANS   2,086,021
BRAKE DRUM AND METHOD OF FORMING THE SAME
Filed May 20, 1929
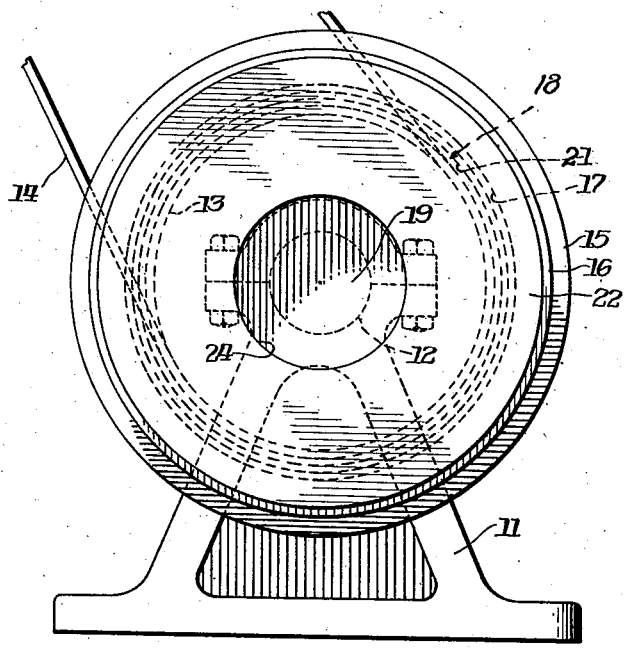
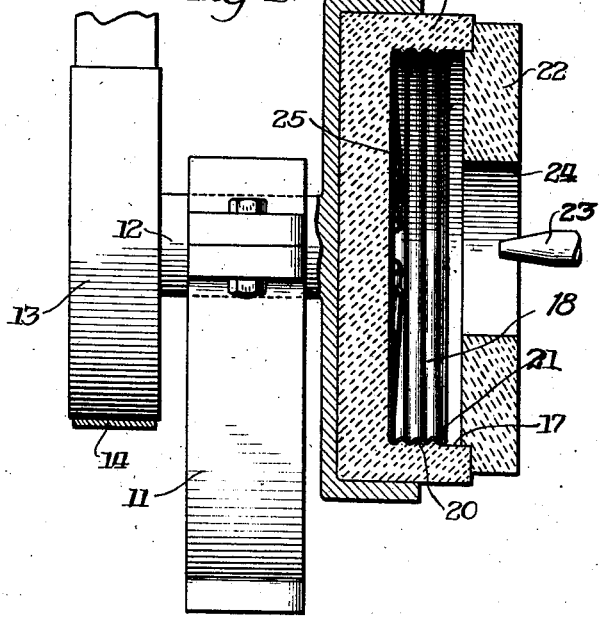
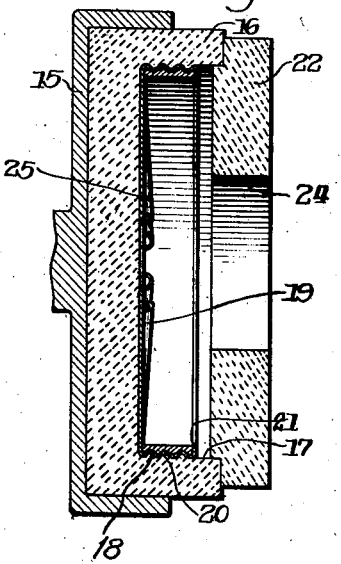
Inventor:
Edwin R. Evans
By *William Dunlap Ryon Wright*
Attys Patented July 6, 1937

2,086,021

UNITED STATES PATENT OFFICE 2,086,021

BRAKE DRUM AND METHOD OF FORMING THE SAME

Edwin R. Evans, Chicago, Ill., assignor, by mesne assignments, to Campbell, Wyant and Cannon Foundry Company, Muskegon Heights, Mich., a corporation of Michigan Application May 20, 1929, Serial No. 364,418

18 Claims. (Cl. 22—204)

This invention relates to a new and improved method of forming a brake drum or the like, and to a brake drum or similar structure formed by such method.

The brake drums as now generally used upon motor vehicles and for similar purposes, are formed of pressed steel and the braking surfaces are machined to bring them to a smooth surface. This machining destroys the original surface of the sheet metal and while it provides a smooth braking surface, this surface is readily subject to scoring by foreign matter which may work in between the drum and brake shoes or brake band, or by particles which may be worked loose or torn off the turned metal. This is particularly true since later developments in brakes tend toward the use of greater braking areas together with the use of hardened brake linings and greater braking pressures with lower coefficients of friction. Foreign materials, such as sand or grit or segregated steel particles, are held by the hard moulded brake lining and the lining forces it against the rotating drum, causing scoring of the drum.

It has been found that a cast iron drum is superior to a pressed steel drum, particularly with reference to the matter of scoring, as the cast iron drum scores less readily. It is also superior insofar as its braking action with the lining is concerned. It has been considered impractical, however, to use cast iron brake drums on motor vehicles, due to the excessive weight of metal necessary to provide a cast iron brake drum of adequate strength.

It is an object of the present invention to provide a brake drum or the like and a method of forming the same, which brake drum will combine the desired qualities of a pressed steel metal drum and of a cast iron drum.

It is a further object to provide a drum of this character in which the braking surface will be formed of cast metal.

It is also an object to provide a method of forming such drums by casting the iron into the steel in such manner as to prevent the parting of the bond between the cast iron and the steel due to the variation in the shrinkage of the cast iron during the cooling operation.

It is a further object to provide a casting method wherein the temperature of the steel drum is raised before casting the iron therein to insure a better bond.

It is an additional object to provide a method of forming such a drum which may be carried on commercially and will produce a composite steel and iron drum at low cost and which may be made of an even lighter weight than present pressed steel drums.

Other and further objects will appear as the description proceeds.

I have shown in the accompanying drawing, somewhat diagrammatically, one form of apparatus suitable for making the drum according to the present invention.

In the drawing—

Figure 1 is a side view of the apparatus for rotating the drum during the casting of the lining;

Figure 2 is a view of Figure 1 as seen from the right, with parts in section; and Figure 3 is a fragmentary view of part of Figure 2, showing a completed drum.

In the drawing, the stand 11 supports the shaft 12 carrying the drive pulley 13 which is driven by the belt 14. Upon the opposite side of the stand 11 the shaft 12 carries the metal holder 15 in which is supported the firebrick or refractory holder 16. This holder 16 has a recess 17 into which may be fitted a sheet metal shell 18. This shell 18 is shown with a closed side or flange 19, which will later be secured to the wheel to hold the drum in place if the drum is used upon a motor vehicle. This side or flange 19 may later have its center punched or cut out to permit passage of the wheel axle or such cutting may be done before the casting operation.

The axially extending intermediate portion 20 of the drum is formed with a plurality of circumferentially extending corrugations. These aid in giving rigidity to the structure and are also of value in that they afford an area for air cooling the surface of the drum in use. The radial ribs 25 give stiffness and rigidity to the flat portion of the drum and additional ribs may be used if desired. The opposite edge of the drum shell is provided with an inturned flange 21. In the manufacture of the composite drum this shell is formed from sheet steel and is placed in the firebrick holder 16. A partial closure 22 formed of firebrick may be placed over the open side of the holder 16.

The nozzle 23 is inserted adjacent the opening 24 in the member 22, and a flange may be directed against the drum shell. The shell is preferably heated to a temperature ranging between approximately 1200° and 1500° F. and the nozzle is then withdrawn. The casting will then take place and it will be understood that the shell and holder are rotated during the casting by power supplied to the pulley 13 by the belt 14. Molten cast iron is introduced by a suitable nozzle and flows into the shell 18, the centrifugal force causing it to be evenly distributed throughout the circumference of the shell. This iron will fill the shell up to the level of the flange 21. It will be understood that the temperature of the cast iron will be approximately 2200° F., and it has been found that if the steel shell is raised to approximately the temperature specified above before the casting, the iron and steel will be burned together sufficiently to form an effective joint and cooling may be made uniform and slow to any desired degree.

The iron will not be chilled to the degree which would result were the steel shell cold, and also the iron will be cleaner since it has been revolved while pouring. It will be understood that the corrugations of the drum have an additional function in affording greater surface for adhesion between the iron and steel.

The approximate temperatures specified are important in securing an efficient structure with the metals properly bonded together and the cast iron burned onto the steel surface. Cast iron will be molten at 2200° F. and will contract as it solidifies and its temperature falls to a point where it ceases to contract and expands slightly. The steel then contracts as the cooling is completed. By having the steel shell within approximately the temperature range specified, its temperature is such that when the molten iron, which is several hundred degrees hotter, strikes the steel the whole mass will be raised to an even temperature somewhere in between the temperatures of the two metals and they will both be maintained at the same temperature while the cast iron cools to a point where it ceases to contract. As the cast iron slightly expands at this intermediate temperature without any change in temperature, the steel being hot with the iron and thin in section will be forced to a slightly larger diameter by the increase in size of the cast iron and the two metals will then cool down slowly as a unit and there will be no danger of separating the iron and the steel.

While I have shown one preferred form of construction of a brake drum by way of example, and have described one method of making it, it is to be understood that my invention applies to other articles of a similar nature and that both method and apparatus may be varied to conform to different conditions or requirements. I contemplate, therefore, such changes and modifications as come within the spirit and scope of the appended claims.

I claim:

1. A brake drum comprising an outer supporting metal drum shell having a cylindrical drum flange of wrought steel, and a centrifugally cast metal continuous band located within and against said flange having a continuous fused bond connection therewith at the inner and outer sides respectively of the drum shell and band.

2. A brake drum or the like comprising an outer supporting shell of wrought steel, and an inner wearing band of centrifugally cast iron fused to said steel shell at its inner side.

3. A cylindrical brake drum comprising a wrought steel housing, and a continuous, integral, cylindrical centrifugally cast iron liner therefor, the opposed surfaces of the housing and liner being fused together throughout their entire opposed areas.

4. A cylindrical shell of wrought metal, and a continuous integral, cylindrical, centrifugally cast iron liner therein, the opposed surfaces of the shell and liner having a fused union throughout their opposed areas.

5. The process of lining a wrought preformed steel drum with cast iron which consists in heating the drum to a temperature above that at which contact between melted iron and the drum will cause solidification of the iron and below 1500° F., rotating the drum about its central axis, discharging a stream of melted iron against the inner periphery thereof, the speed of rotation being such that the melted iron is held by centrifugal force against the inner periphery of and is entirely supported by the drum in a continuous fluid ring, continuing the rotation of the drum until the melted iron has solidified and has formed a continuous uniform fused union between the inner periphery of the drum and the resultant cast iron lining ring.

6. The method of making a brake drum or the like, which comprises forming a thin pressed steel shell, heating the shell to a temperature ranging between approximately 1200° to 1500° F. and casting in said shell an iron lining at a temperature of approximately 2200° F.

7. The method of forming a brake drum or the like which comprises forming a thin pressed steel shell having a plurality of circumferentially extending corrugations, heating said shell to approximately 1200° to 1500° F. and centrifugally casting in said shell a cast iron lining of greater thickness than the radial depth of the corrugations.

8. A brake drum comprising, a steel support adapted to be connected with a wheel and a braking flange of centrifugally cast iron fused with said support.

9. A brake drum comprising, a steel supporting body and an annular brake engaging member of centrifugally cast iron molecularly bonded to said supporting body.

10. A cylindrical brake drum or the like comprising a steel support and a continuous integral cylindrical centrifugally cast iron braking ring cast upon said support and fused thereto.

11. A brake drum or the like including, a cylindrical sheet shell having a continuous peripheral groove and a braking ring of cast iron located within and surrounded and supported by said shell, said cast iron braking ring being cast upon the shell and having a peripheral rib integral with the cast iron ring and filling the groove.

12. A brake drum comprising, a steel support and an annular centrifugally cast iron braking flange fused to said support and interlocking therewith.

13. The method of forming a brake drum or the like which comprises, the forming of a steel support adapted to be connected with a wheel and casting thereon and fusing a braking flange of cast iron to said support.

14. A pressed sheet metal brake drum comprising an annular braking flange of substantially uniform thickness throughout and provided with attaching means, said braking flange having between its edges distorted portions correspondingly affecting both the inner and outer faces of the flange, and disposed in lines extending circularly around the flange to stiffen the flange, and a friction lining extending entirely around said braking flange and rigidly held with respect thereto, said lining having one face engaging a face of said flange and fitting the distorted portions thereof, and an opposite direction face coaxial with the axis of rotation of the drum.

15. A pressed sheet metal brake drum comprising an annular braking flange of substantially uniform thickness throughout, provided at each edge with an inwardly extending flange substantially perpendicular thereto, one of said flanges being provided with attaching means for the drum, and the other of said flanges constituting a reinforcing lip, the said flange between its edges having distorted portions correspondingly affecting the inner and outer faces of the flange, extending continuously and circularly around the flange to form parallel corrugations coaxial with respect to the axis of the drum, to stiffen the flange, and an annular friction lining extending around the inner face of the braking flange between said inwardly extending flanges and permanently held with respect to the braking flange, said lining having its outer face provided with parallel corrugations fitting the parallel corrugations in the inner face of said braking flange, and having an inner friction face coaxial with the axis of rotation of the drum.

16. A pressed sheet metal brake drum comprising an annular braking flange of substantially uniform thickness throughout, provided at each edge with an inwardly extending flange substantially perpendicularly thereto, one of said flanges being provided with attaching means for the drum, and the other of said flanges constituting a reinforcing lip, the said flange between its edges having distorted portions correspondingly affecting the inner and outer faces of the flange and disposed in lines extending circularly around the flange coaxially with respect to the axis of rotation of the drum, to stiffen the flange, and an annular friction lining having its outer face in contact throughout with the inner face of the braking flange between the said inwardly extending flanges thereof, and conforming to the distorted portions of said inner face, said lining having a thickness substantially corresponding to the depth of the flange constituting the reinforcing lip.

17. A pressed sheet metal brake drum comprising an annular braking flange of substantially uniform thickness throughout, provided at each edge with an inwardly extending flange substantially perpendicular thereto, one of said flanges being provided with attaching means for the drum, and the other of said flanges constituting a reinforcing lip, the said flange between its edges having distorted portions correspondingly affecting the inner and outer faces of the flange, and extending continuously and circularly around the flange to form parallel corrugations coaxial with respect to the axis of the drum, to stiffen the flange, and an annular friction lining having its outer face in contact throughout with the inner face of the braking flange between the said inwardly extending flanges thereof, and conforming to the distorted portions of said inner face, said lining having a thickness substantially corresponding to the depth of the flange constituting the reinforcing lip.

18. A brake drum, comprising a body, an annular member connected to said body and an annular brake engaging member molecularly bonded to said annular member.

EDWIN R. EVANS.